(12) United States Patent
Richter

(10) Patent No.: US 6,357,702 B1
(45) Date of Patent: Mar. 19, 2002

(54) PIPE GUIDE APPARATUS AND SYSTEM FOR PREVENTING NON-AXIAL PIPE MOVEMENT

(75) Inventor: James R. Richter, Lincolnshire, IL (US)

(73) Assignee: Metraflex Company, Chicago, IL (US)

( * ) Notice: Subject to any disclaimer, the term of this patent is extended or adjusted under 35 U.S.C. 154(b) by 0 days.

(21) Appl. No.: 09/293,778

(22) Filed: Apr. 19, 1999

(51) Int. Cl.[7] .................................................. F16L 3/16
(52) U.S. Cl. ......................................... 248/55; 248/74.2
(58) Field of Search .............................. 248/55, 62, 65, 248/74.1, 74.2, 219.4, 201, 200.1, 295.11; 52/714

(56) References Cited

U.S. PATENT DOCUMENTS

| 104,284 A | 6/1870 | Donnelly et al. |
| 411,518 A | 9/1889 | Collis |
| 700,378 A | 5/1902 | Schmidt |
| 2,256,388 A | 9/1941 | Fentress |
| 2,269,700 A | * 1/1942 | Treshow ........................ 263/33 |
| 2,511,335 A | 6/1950 | Guarnaschelli |
| 2,641,429 A | * 6/1953 | Kozak ........................... 248/65 |
| 3,375,045 A | 3/1968 | Zeidler |
| 4,002,357 A | 1/1977 | Bennett |
| 4,128,219 A | * 12/1978 | Kaigler, Jr. et al. ........... 248/55 |
| 4,238,104 A | * 12/1980 | Hamilton ..................... 248/566 |
| 4,244,543 A | 1/1981 | Ericson |
| 4,295,667 A | 10/1981 | Zahs et al. |
| 5,054,251 A | * 10/1991 | Kemeny ........................ 52/167 |
| 5,195,784 A | 3/1993 | Richter |
| 5,445,348 A | * 8/1995 | Caldwell et al. ............ 248/74.1 |
| 5,669,591 A | * 9/1997 | Perez ........................... 248/201 |
| 6,053,666 A | * 4/2000 | Irvine et al. ................. 405/279 |

OTHER PUBLICATIONS

Gebhardt, *Steam Power Plant Engineering*, Fifth Edition, John Wiley & Sons, Inc., Publishers, pp. 728–739 (1917).

* cited by examiner

Primary Examiner—Ramon O. Ramirez
Assistant Examiner—A. Joseph Wujciak
(74) Attorney, Agent, or Firm—Sonnenschein Nath & Rosenthal

(57) ABSTRACT

A pipe guide apparatus and system. The pipe guide includes a first member being secured to the pipe and having at least one element extending parallel to an axis of the pipe and a second member being secured to a fixed structural component and having at least one element extending parallel to the pipe axis. In addition, a layered member is provided wherein the elements of the first and second members and the layered member are configured and engaged in a mating relationship to permit axial movement of the first member relative to the second member, yet to prevent non-axial pipe movement due to external forces. In this mating relationship, the layered member further acts to absorb shock or vibration due to pipe movement, thereby greatly reducing noise being transferred to the surrounding environment. A plurality of pipe guides, alone or in combination with an expansion joint member, may be employed within the pipe guide system.

19 Claims, 2 Drawing Sheets

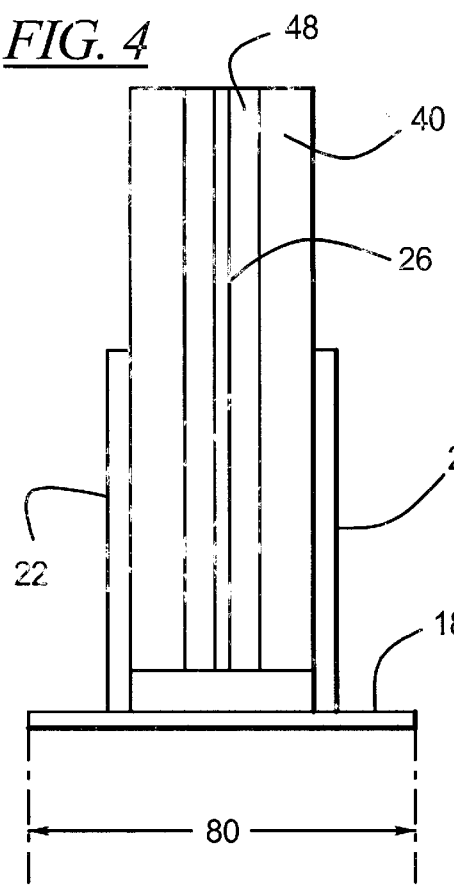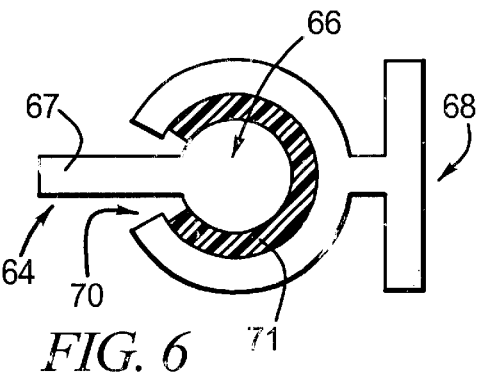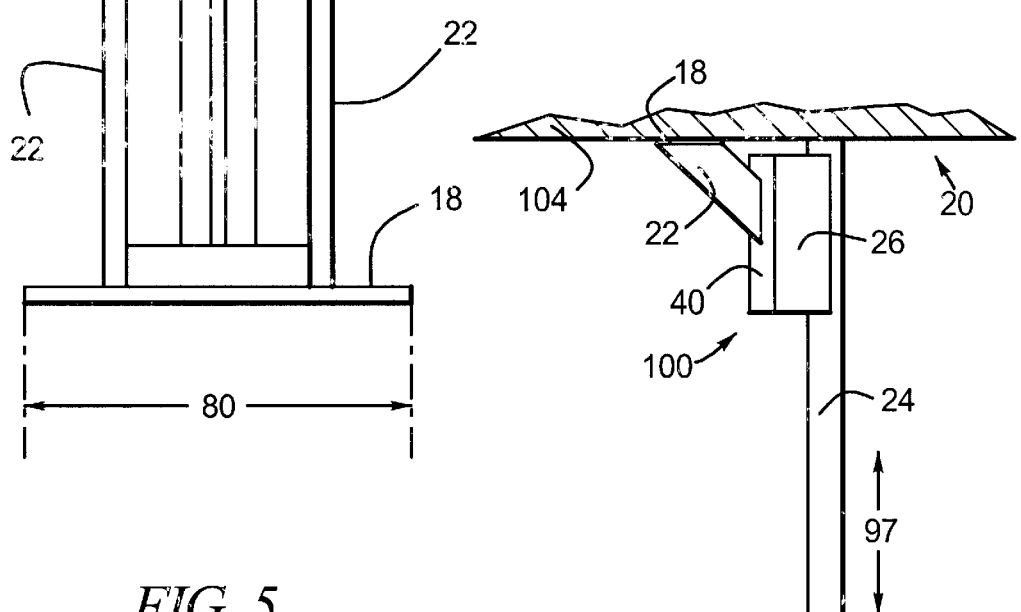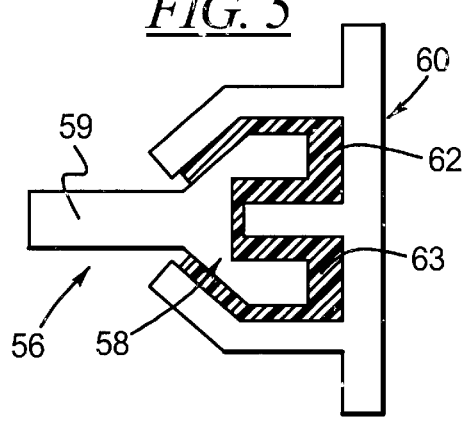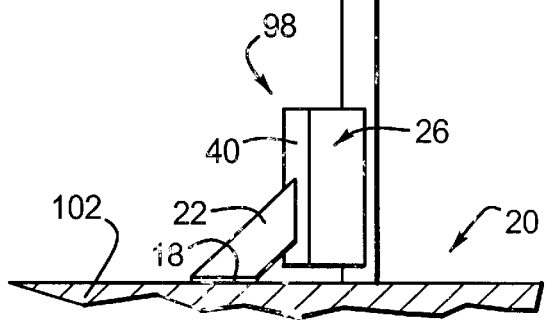

PIPE GUIDE APPARATUS AND SYSTEM FOR PREVENTING NON-AXIAL PIPE MOVEMENT

BACKGROUND OF THE INVENTION

The present invention relates to an apparatus for guiding pipes and a system for preventing non-axial movement of pipes, while permitting axial movement.

Methods and devices for absorbing movement in runs or lines of pipe are generally known to accommodate pipe movement due to external forces such as, expansion, contraction, building movement, earthquake, explosion or other factors. In particular, pipe loops, wherein axial pipe runs are interrupted by U-shaped loops or bellows type joints to allow for movement of the pipe, have been provided. However, the use of such U-shaped loops or bellows-type joints has required very substantial anchoring of the pipe since the flexing of joints produces thrust loads in a non-axial direction. Thus, anchoring thrust blocks, or structural steel has been necessary to accommodate these thrust loads. To alleviate the non-axial thrust loads, an expansion loop has been provided that is also integrated within the axial pipe run. In addition, the use of a conventional anchor and pipe guide to support the movement of the pipe being acted upon by the expansion loop has been provided. It is generally known that the anchor and guide are attached along the pipe in close proximity to the expansion loop.

An existing problem in the art has been to greatly reduce or eliminate non-axial pipe movement, particularly where the use of a known pipe loop integral to an axial pipe run is not feasible. In addition, there exists the problem of providing a pipe guide where it is difficult, or impossible, to install conventional pipe guides. In many situations, pipes are installed where no solid wall is available to attach conventional pipe guides. Moreover, a continuing problem exists with the use of conventional pipe guides to reduce the level of noise due to vibration or shock being transferred by the pipe.

SUMMARY OF THE INVENTION

The present invention provides a pipe guide apparatus and system utilizing a first member being secured to the pipe and having at least one element extending parallel to an axis of the pipe and a second member being secured to a fixed structural component and having at least one element extending parallel to the pipe axis. As such, the elements of the first and second members are configured and engaged in a mating relationship to permit axial-only movement of the first member relative to the second member, thereby preventing non-axial pipe movement due to external forces.

The present invention further provides a layered element adapted to engage the first and second members in order to facilitate axial-only movement between the first and second members. Preferably, the layered member is formed of a low friction and resilient material, such as a nylon or plastic material. The low friction quality of the layered member allows a sliding member to closely engage the layered member, thereby preventing non-axial movement, yet permitting virtually unhindered axial movement. The resilient characteristic further allows the layered member to absorb shock or vibration due to the axial and non-axial pipe movement, thereby greatly reducing or eliminating noise being transferred to the surrounding environment. The layered member is preferably attached to the stationary second member wherein the first member closely engages the layered member as the first member moves due to pipe movement, thereby preventing non-axial pipe movement.

Furthermore, the present invention provides a pipe guide system which includes a plurality of pipe guides, alone or in combination with an expansion joint member, attached to a pipe extending along a longitudinal axis. In general use, the pipe is likely to extend between and through at least two fixed structural components, such as two walls or a floor and a ceiling, where there exists no solid side wall for conventional pipe guides to be attached. In this situation, the first member of the pipe guide is preferably attached to the pipe near the interface where the pipe extends through the fixed structural component. In doing so, the second member of the pipe guide is secured to the fixed structural component, wherein the first and second members are configured and engaged in a mating relationship to permit axial movement of the pipe as described above. In addition, the expansion joint member may be employed in combination with the pipe guide. The expansion joint member, such as a known pipe loop, may be integrally attached to the pipe.

In an embodiment, the first member is a T-slide member and the second member is a C-shaped member. The C-shaped member has a surface defining a channeled opening which has an open length to be aligned parallel to an axis of the pipe. The T-slide member has an element which is axially inserted into the channeled opening such that it can slide in the direction of the open length, that is, in an axial direction. As such, the C-shaped member substantially radially surrounds the element to the extent that a portion of the element also extends through the channeled opening and is adapted to engage a pipe in a fixed manner.

In another related embodiment, the first member is the C-shaped member and the second member is the T-slide member, wherein the C-shaped member moves relative to the T-slide member.

In a related embodiment, the pipe guide apparatus includes a base plate secured to the fixed structural component and an arm attaching to and extending from the base plate to secure the second member.

In an embodiment, a pipe guide system provides a pipe extending between at least two fixed structural components and a plurality of pipe guides, wherein the plurality of pipe guides attach to the pipe along an axis of the pipe. Each pipe guide includes a first member being secured to a pipe and having at least one element extending parallel to the pipe axis, and a second member being secured to a fixed structural component and having at least one element extending parallel to the pipe axis. The elements are configured and engaged in a mating relationship to permit axial movement of the first member relative to the second member, thereby preventing non-axial pipe movement due to external forces.

Additional features and advantages of the present invention are described in, and will be apparent from, the detailed description of the presently preferred embodiment.

BRIEF DESCRIPTION OF THE DRAWINGS

FIG. 4 illustrates a front sectional view of the pipe guide.

FIG. 5 illustrates a top view of a Y-shaped member and corresponding member configured and engaged in a mating relationship.

FIG. 6 illustrates a top view of a circular-shaped member and its corresponding member configured and engaged in a mating relationship.

FIG. 7 illustrates a perspective view of a pipe guide system wherein the pipe guide is attached to a pipe extending between and through a floor and ceiling.

DETAILED DESCRIPTION OF THE PRESENTLY PREFERRED EMBODIMENTS

Figure 1:
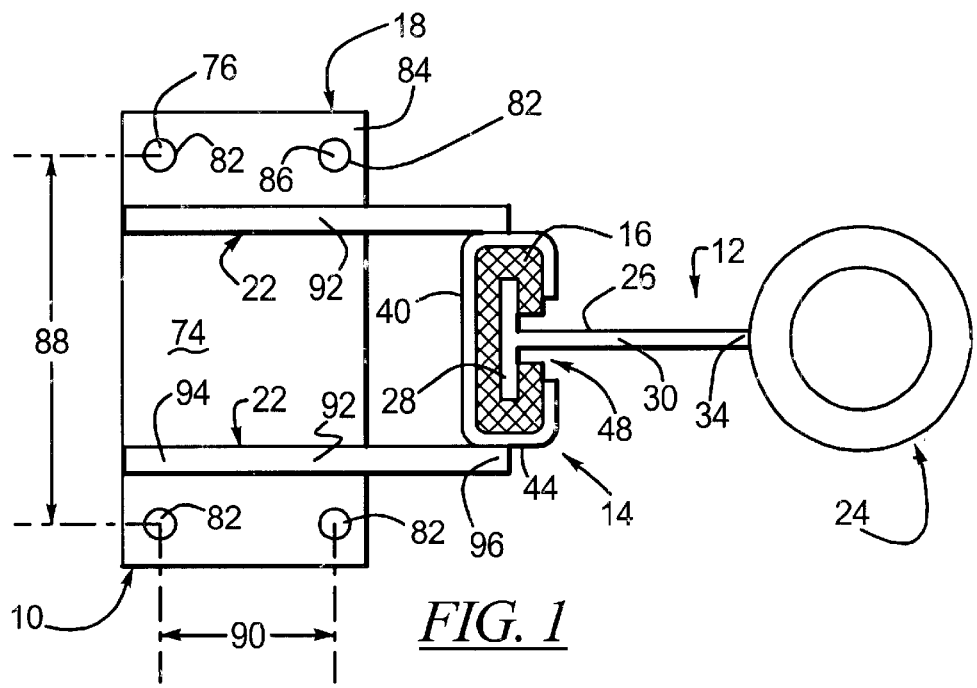
FIG. 1 illustrates a top view of a pipe guide embodying preferred features of the present invention.

The present invention provides a pipe guide apparatus and system. The present invention preferably relates to a pipe guide apparatus and system for preventing non-axial pipe movement due to the thermal expansion of pipes while transferring high temperature liquids. However, the present invention is not limited to preventing non-axial movement due only to thermal expansion. The present invention may be used to prevent non-axial pipe movement more generally due to other external forces. In addition, the pipe guide apparatus and system may be used for a variety of different pipes, tubes, rods or other elongated members that demonstrate a wide range of utilities.

To prevent non-axial pipe movement, the pipe guide includes a first member having a first and second end. The first end is securely attached to the pipe, wherein the second end is free and has at least one element extending parallel to an axis of the pipe. The second member also has a first and second end. The first end of the second member attaches to a fixed structural component. In turn, the second end of the second member is free and also has at least one element extending parallel to the pipe axis. As such, the corresponding elements of the first and second members are configured and engaged in a mating relationship to permit axial movement of the first member relative to the second member, yet to prohibit non-axial movement there-between.

To facilitate movement between the first and second members, the pipe guide further includes a layered member. The layered member preferably attaches to at least a portion of the element of the second member although it could alternatively be attached to the first member. The layered member is further positioned between the corresponding elements of the first and second member. Once the elements of the first and second members are configured and matingly engaged, the element of the first member can then slide axially against the layered member. As described above, the layered member is preferably formed of a low friction and resilient material, such as a nylon or plastic material, to facilitate axial-only movement of the first member and to absorb shock or vibration, thereby greatly reducing or eliminating noise being transferred to the surrounding environment or transmitted through the structural component or the pipe.

FIGS. 1–7 illustrate a pipe guide 10 embodying the preferred features of the present invention. However, the pipe guide 10 may be constructed in a variety of different other ways to accomplish the objective of preventing non-axial pipe movement and greatly reducing or eliminating noise due to shock or vibration of the pipe. For example, the features of the present invention, such as the first, second and layered member, can be formed in a variety of different shapes and sizes and of a variety of different materials.

Turning to FIGS. 1–4, the pipe guide 10 includes a first 12, second 14 and layered 16 member as described above. In addition, the pipe guide 10 preferably includes a base plate 18 that secures to a fixed structural component 20 (FIG. 7), such as a wall, ceiling or floor. An arm 22 then attaches to and extends from the base plate 18 to secure the second member 14. In turn, the first 12 member is adapted to engage the pipe 24. As described above, the first 12, second 14 and layered 16 members are configured and engaged in a mating relationship to permit axial movement of the first member 12 relative to the second member 14, but to prevent non-axial movement of the first member 12, thereby preventing non-axial pipe movement as the pipe 24 moves due to external forces.

Figure 2:
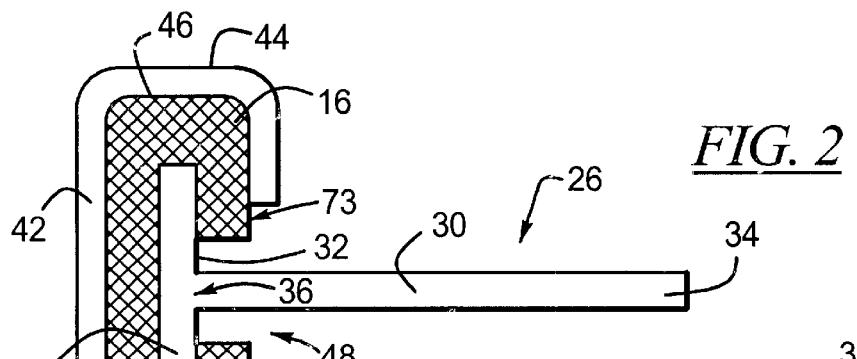
FIG. 2 illustrates a top view a C-shaped and T-slide member.

Turning to FIGS. 1 and 2, the first 12 member preferably includes a T-slide member 26. The T-slide 26 member has a base 28 and an extension 30. The base 28 is adapted to engage the second 14 and layered 16 members. In turn, the extension 30 is preferably adapted to engage the pipe 24. The base 28 and extension 30 of the T-slide member 26 are a rigid material and can be formed of a mild carbon steel or other similar material. The base 28 is defined by a surface 32, and the extension 30 has a first 34 and second 36 end. The first end 34 of the extension 30 preferably attaches to at least a portion of the pipe 24. The second end 36 of the extension 30 attaches to at least a portion of the base surface 32. The second end 36 can be attached to the base surface 32 by welding or attached by other similar attachment methods.

Figure 3:
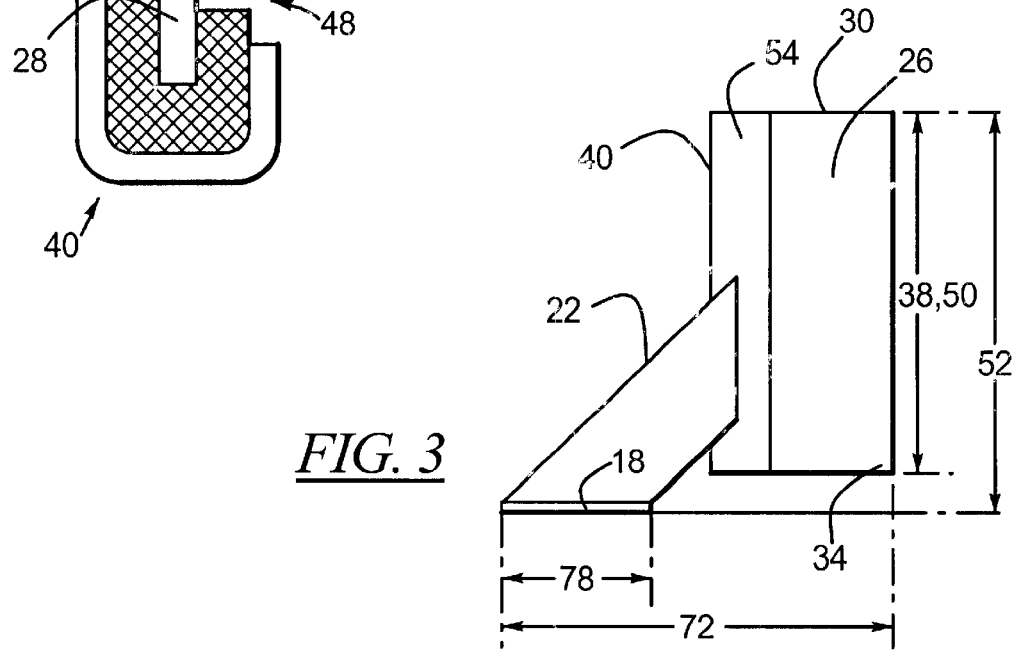
FIG. 3 illustrates a side sectional view of the pipe guide.

In an embodiment further illustrated in FIGS. 1–3, the base 28 of the T-slide 26 member includes a length 38 to be aligned parallel to an axis of the pipe 24. The extension 30 extends along at least a portion of the length 38. As FIG. 3 illustrates, the base length 38 preferably equals ten inches wherein the extension 30 extends along the entire base length 38. However, the extension 30 may extend along the base 28 in a variety of different lengths so as to effectively support the base 28 of the T-slide 26 member.

Turning further to FIGS. 1–3, the second 14 member preferably includes a C-shaped 40 member having a surface 42 with a first 44 and second 46 side. The surface 42 further defines a channeled opening 48. The channeled opening 48 has an open length 50 to be aligned parallel to an axis of the pipe 24. The C-shaped member 40 is a rigid material and can be preferably formed of a mild carbon steel or other similar material. In an embodiment as further illustrated in FIG. 3, the open length 50 of the C-shaped member 40 preferably equals ten inches. In addition, a distance 52 between a top 54 of the C-shaped member 40 and the base plate 18 preferably equals eleven inches. The C-shaped member 40 may include a variety of different open lengths 50 and be attached to the arm 22 at a variety of different positions relative to the base plate 18.

As further illustrated in FIGS. 1 and 2, the T-slide 26 and C-shaped 40 members are preferably configured and engaged in a mating relationship to permit axial movement of the T-slide 26 member relative to the C-shaped 40 member. The base 28 of the T-slide 26 member is axially inserted into the channeled opening 48 of the C-shaped 40 member extending along at least a portion of the open length 50. Once the base 28 is inserted within the channeled opening 48, the C-shaped member 40 substantially radially surrounds the base 28 to the extent that a portion of the extension 30 of the T-slide 26 member extends through the channeled opening 48 to engage the pipe 24. In particular, the first end 34 of the extension 30 attaches to at least a portion of the pipe 24 extending along an axis of the pipe 24. The first end 34 of the extension 30 may be welded to the pipe or attached by other attachment methods. As the pipe 24 moves due to external forces, the pipe 24 acts on the T-slide 26 member. The T-slide 26 member then moves axially within the channeled opening 50 of the C-shaped 40 member.

Alternatively, the T-slide 26 member may be adapted to engage the fixed structural component 20 (FIG. 7), and the C-shaped 40 member may be adapted to engage the pipe 24.

In this respect, the C-shaped 40 member would move relative to the stationary T-shaped 26 member. Furthermore, the present invention is not limited to the size and shape of the T-slide 26 and C-shaped 40 members. On the contrary, the first 12 and second 14 members may include members of varying shapes and sizes. For example, the first 12 and second 14 members may be configured and engaged in a mating relationship as illustrated in FIGS. 5 and 6. In FIG. 5, a member 56 has a Y-shaped base 58 and an extension 59. In turn, a member 60 provides a channeled opening 62 with a layered member 63 therein, such that the Y-shaped base 58 of the member 56 may be inserted into the channeled opening 62 of the member 60 so as to facilitate axial-only movement of the movable member relative to the stationary member. Once the Y-shaped base 58 is inserted into the channeled opening 62, the member 60 substantially radially surrounds the Y-shaped base 58 to the extent that a portion of the extension 59 extends through the channeled opening 62. Another possible configuration and mating engagement of the first 12 and second 14 members is illustrated in FIG. 6. In FIG. 6, a member 64 includes a circular-shaped base 66 and an extension 67. The other member 68 again provides a channeled opening 70 with a layered member 71 therein, such that the circular-shaped base 66 may be inserted into the channeled opening 70 so as to facilitate axial-only movement. In addition, the member 68 substantially radially surrounds the circular-shaped base 66 to the extent that a portion of the extension 67 extends through the channeled opening 70.

As further illustrated in FIG. 3, the base length 38 of the T-slide 26 member preferably equals the open length 50 of the channeled opening 48, namely ten inches. However, the base length 38 relative to the open length 50 may include a variety of different lengths sufficient to promote guidance of the base 28 within the channeled opening 48 without twisting or binding of the base 28. Moreover, the first end 34 preferably extends to a distance 72 of 10⅜ inches from the base plate 18. However, the first end 34 may extend to the pipe 24 in a variety of different distances relative to the base plate 18 so as to firmly support the movement of the T-slide 26 member being acted upon by the pipe 24.

To further facilitate axial-only movement between the first 12 and second 14 members as illustrated in FIGS. 1 and 2, the pipe guide 10 includes a layered 16 member. The layered 16 member is positioned between the first 12 and second 14 members. As previously described, the layered 16 member is formed of a low friction and resilient material, such as a nylon, plastic or other similar material. The low friction quality of the layered 16 member allows a sliding member, such as the first 12 member, to closely engage the layered 16 member, thereby preventing non-axial movement, yet permitting virtually unhindered axial movement. The resilient characteristic further allows the layered 16 member to absorb shock or vibration due to the pipe movement, thereby greatly reducing or eliminating noise being transferred to the surrounding environment. The layered 16 member may be attached to either the first 12 or second 14 members. The layered 16 member may be adhesively attached or attached by other similar methods. However, the layered 16 member is preferably attached to the stationary second 14 member wherein the first member 12 then slides axially against the layered 16 member as the pipe moves due to external forces. As further illustrated in FIG. 2, the layered 16 member attaches to at least a portion of the surface 42 on the second side 46 of the C-shaped member 40 extending along at least a portion of the open length 50 of the channeled opening 48. However, the layered 16 member preferably extends along the entire open length 50, wherein the base 38 of the T-slide 26 member slides axially against at least a portion of a surface 73 of the layered 16 member.

In an embodiment as illustrated in FIGS. 1 and 3, the pipe guide 10 is preferably secured to the fixed structural component 20 (FIG. 7) by the base plate 18. The base plate 18 includes a surface 74 and a plurality of holes 76, wherein the plurality of holes 76 extend through the surface 74 of the base plate 18. The base plate 18 is rigid and can be formed of a mild carbon steel or other like material. FIGS. 1, 3 and 4 further illustrate that the base plate 18 has a preferable rectangular shape defined by a width 78 and length 80. The width 78 and length 80 preferably equal four and 6½ inches respectively. Alternatively, the base plate 18 may be provided in a variety of different shapes and sizes so as to firmly secure the pipe guide 10, namely the second 14 member of the pipe guide 10, to the fixed structural component 20, such as a wall, ceiling or floor.

In an embodiment as further illustrated in FIGS. 1 and 3, the base plate 18 preferably includes four holes 82 wherein each hole 82 is positioned near one corner 84 of the base plate 18. The holes have a diameter 86, wherein the diameter 86 preferably equals 7/16 inches. In addition, the holes 82 are spaced from one another a distance 88 extending along the length 80 of the base plate 18. This distance 88 preferably equals 5¼ inches. Likewise, the holes 82 are separated from one another a distance 90 extending along the width 78 of the base plate 18. This distance 90 preferably equals 2⅞ inches. The base plate 18 may include a varied number of holes 82. In addition, the holes 82 may include a variety of different sizes and shapes and be positioned at a variety of different locations on the base plate 18. A bolt (not shown) or similar fastening device is then inserted into each hole 82 so as to firmly secure the base plate 18 to the fixed structural component 20. The bolt is preferably ⅜ inches in size and can be formed of a mild carbon steel or other like material. The base plate 18 may include a bolt or similar fastening device of varying size and shape. Alternatively, the base plate 18 may not include any holes 82, wherein the base plate 18 may then be firmly secured to the fixed structural component 20 by a fastening mechanism other than being bolted.

In an embodiment further illustrated in FIGS. 1–4, the pipe guide 10 preferably includes the arm 22 wherein the arm 22 attaches to and extends from the base plate 18 to firmly secure the C-shaped member 40. The arm 22 is a rigid material and can be formed of a mild carbon steel or other like material. As further illustrated in FIGS. 1, 3 and 4, the arm 22 preferably has two members 92. Each member 92 has a first 94 and second 96 end. The first 94 end of the arm 22 firmly secures along at least a portion of the surface 74 of the base plate 18. The first end 94 may be welded or attached by a similar method to the base plate 12. The second end 96 of the arm 22 then extends from the base plate 12 to secure along at least a portion of the surface 42 on the first side 44 of the C-shaped member 40. The second end 96 may be welded or attached by a similar method to the C-shaped member 40. The arm 22 may also include a varied number of arm members 92 having a variety of different shapes and sizes.

In an embodiment as illustrated in FIG. 7, the present invention further provides a pipe guide system wherein the pipe guide 10 may be employed in a variety of different ways to prevent non-axial movement of the pipe 24 due to external forces, such as thermal expansion, acting upon the pipe 24. The pipe guide system includes a plurality of pipe guides 10 and the pipe 24 extending along a longitudinal axis 97, wherein each pipe guide 10 attaches to the pipe 24 along the longitudinal axis 97.

In an embodiment, the pipe guide 10 preferably provides two members 98, 100. Each member 98, 100 attaches to the pipe 24 and the fixed structural component 20 as previously described. As further illustrated in FIG. 7, the pipe 24 is positioned between and through two fixed structural components 20, namely a floor 102 and a ceiling 104. In this situation, the member 98 preferably attaches to the floor 102 and the other member 100 attaches to the ceiling 104. Once each member 98, 100 is attached to the pipe 24 and secured to the fixed structural component 20, each member 98, 100 operates to prevent non-axial movement of the pipe 24 due to external forces as previously described. Alternatively, the pipe 24 may be positioned between and through the floor 102 and ceiling 104 or other fixed structural components 20, wherein a plurality of pipe guides 10 could be attached to the pipe 24 at each fixed structural component 20. However, the present invention is not limited by the number, type and relative location to the pipe 24 of the fixed structural component 20. Moreover, the present invention is not limited by the number and positioning of pipe guides 10 along the pipe 24 so as to prevent non-axial pipe movement.

In an embodiment, the pipe guide system may also include an expansion joint member (not shown), such as a known pipe loop, along with the pipe guide 10. Known pipe loops may include U-shaped loops, bellows-type joints, or expansion loops as disclosed in U.S. Pat. No. 5,195,784 and incorporated herein by reference.

In an embodiment, a plurality of pipe guides 10 are attached to the pipe 24 as illustrated in FIG. 7. In addition, the expansion joint member integrally attaches to the pipe 24. As the pipe 24 moves due to thermal expansion or other external forces, both the expansion joint member and the plurality of pipe guides 10 act to prevent non-axial pipe movement. In addition, the use of the plurality of pipe guides 10, as compared to the use of multiple conventional pipe guides, in combination with the expansion joint member, greatly reduces or eliminates noise and vibration from being transferred to the building. Unlike the conventional pipe guides, the pipe 24 does not move through and rub against the pipe guide 10 of the present invention, but rather the first member 12 is firmly attached to the pipe 24, wherein the first member 12 and moves relative to the second member 14. Moreover, the present invention further provides a layered member 16 being positioned between the first 12 and second 14 members to facilitate movement of the first 12 member relative to the second member 14, as described previously, thereby greatly reducing or eliminating noise and vibration due to movement of the pipe 24.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

The embodiments of the invention in which an exclusive property or privilege is claimed are therefore defined as follows:

1. A pipe guide for allowing movement in a direction of an axis of a pipe and preventing non-axial movement of said pipe within a building comprising:
    a first member adapted at a first end thereof to be securely attached to said pipe and having a free second end;
    a second member adapted at a first end thereof to be securely attached to said building and having a free second end;
        said second end of said first member having at least one element for extending parallel to said pipe axis;
        said second end of said second member having at least one element for extending parallel to said pipe axis;
    a layered member positioned between and in engagement with said first and second members;
        said elements of said first and second members and said layered member being configured and engaged in a mating relationship to permit axial movement of said first member relative to said second member, but to prevent non-axial movement of said first member relative to said second member.

2. The pipe guide as claimed in claim 1, wherein said layered member is attached to said second member element.

3. The pipe guide as claimed in claim 1, wherein said layered member is attached to said first member element.

4. The pipe guide as claimed in claim 1, wherein said layered member comprises a low friction and resilient material to facilitate axial movement of said first member relative to said second member and to substantially reduce noise due to at least one of shock and vibration being transferred by the pipe.

5. The pipe guile as claimed in claim 1, said first member further comprising a T-slide member having a base and an extension, both extending parallel to said axis, wherein said extension is attached to said base, said base being adapted to engage said second member element.

6. The pipe guide as claimed in claim 5, wherein said extension of said T-slide member is adapted to engage said pipe in a fixed manner.

7. The pipe guide as claimed in claim 1, said second member further comprising a C-shaped member defining a channeled opening and extending parallel to said axis, wherein said channeled opening is adapted to engage said first member element to permit axial movement of said first member relative to said C-shaped member.

8. The pipe guide as claimed in claim 7, wherein said C-shaped member is attached to said building.

9. The pipe guide as claimed in claim 1, said second member further comprising a base plate and an arm, wherein said base plate comprises said first end and said arm attaches to and extends from said base plate, thereby extending to said second end of said second member.

10. The pipe guide as claimed in claim 1, wherein said second end of said first member has an enlarged portion and further comprising said second end of said second member having a portion to substantially radially surround said enlarged portion.

11. The pipe guide as claimed in claim 1, further comprising said second end of said first member having an enlarged portion, said second end of said second member having a portion to substantially radially surround said enlarged portion.

12. The pipe guide as claimed in claim 1, wherein said second end of said second member has an enlarged portion and further comprising said second end of said first member having a portion to substantially radially surround said enlarged portion.

13. A pipe guide for allowing movement in a direction of an axis of a pipe and preventing non-axial movement of said pipe within a building comprising:
    a T-slide member having a first and second end;
    a C-shaped member having a base portion at a first end thereof with an arm extending therefrom to a free second end;

said second end of said T-slide member having at least one element extending parallel to said pipe axis;

said second end of said C-shaped member having at least one element extending parallel to said pipe axis, wherein said element defines a channeled opening having an open length to be aligned parallel to said axis of said pipe;

a layered member being positioned between and in engagement with said T-slide and said C-shaped member;

said elements and said layered member being configured and engaged in a mating relationship to permit axial movement of said T-slide member relative to said C-shaped member, but to prevent non-axial movement of said first member relative to said second member.

14. A pipe guide as claimed in claim 13, wherein said layered member is attached to said C-shaped member.

15. A pipe guide as claimed in claim 13, wherein said layered member is attached to said T-slide member.

16. A pipe guide as claimed in claim 13, wherein said first end of said T-slide member is adapted to be attached to said pipe.

17. A pipe guide as claimed in claim 13, wherein said first end of said C-shaped member is adapted to be attached to said building.

18. A pipe guide system for allowing movement in a direction of an axis of a pipe and preventing non-axial movement of said pipe within a building comprising:

a pipe extending between and through at least one fixed structural components;

at least one pipe guide attaching to said pipe wherein said pipe guide attaches to said pipe at each fixed structural component;

said pipe guide comprising a first member adapted at a first end thereof to be securely attached to said pipe and having a free second end, a second member adapted at a first end thereof to be securely attached to said fixed structural component of said building and having a free second end;

said second end of said first member having at least one element extending parallel to said pipe axis;

said second end of said second member having at least one element extending parallel to said pipe axis;

a layered member being positioned between and in engagement with said first and second members;

said elements and said layered member being configured and engaged in a mating relationship to permit axial movement of said first member relative to said second member, but to prevent non-axial movement of said first member relative to said second member.

19. A pipe guide for allowing movement of a pipe in a direction of a pipe axis, and preventing non-axial movement of said pipe within a building comprising:

a first member adapted at a first end thereof to be securely attached to said pipe and having a free second end;

a second member adapted at a first end thereof to be securely attached to said building and having a free second end;

said second end of said first member having at least one element extending parallel to said pipe axis;

said second end of said second member having at least one element extending parallel to said pipe axis;

a layered member positioned between an engagement with said first and second members;

said elements of said first and second members and said layered member being configured and engaged in a mating relationship to permit virtually unhindered axial movement of said first member relative to said second member, but to prevent non-axial movement of said first member relative to said second member.

* * * * *